United States Patent
Kimura et al.

(10) Patent No.: US 11,262,238 B2
(45) Date of Patent: Mar. 1, 2022

(54) WAVELENGTH DETECTION DEVICE AND CONFOCAL MEASUREMENT DEVICE

(71) Applicant: OMRON Corporation, Kyoto (JP)

(72) Inventors: Kazuya Kimura, Kizugawa (JP); Masayuki Hayakawa, Kizugawa (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/970,377

(22) PCT Filed: Mar. 12, 2019

(86) PCT No.: PCT/JP2019/010010
§ 371 (c)(1),
(2) Date: Aug. 16, 2020

(87) PCT Pub. No.: WO2019/176938
PCT Pub. Date: Sep. 19, 2019

(65) Prior Publication Data
US 2021/0088383 A1   Mar. 25, 2021

(30) Foreign Application Priority Data

Mar. 12, 2018   (JP) .............................. JP2018-044588

(51) Int. Cl.
*G01J 3/26* (2006.01)
*G01B 11/00* (2006.01)
(Continued)

(52) U.S. Cl.
CPC ............... *G01J 3/26* (2013.01); *G01B 11/00* (2013.01); *G01J 3/36* (2013.01); *G01J 3/51* (2013.01)

(58) Field of Classification Search
CPC ...................................... G01J 3/36; G01J 3/51
See application file for complete search history.

(56) References Cited

U.S. PATENT DOCUMENTS 3,748,035 A * 7/1973 Mannik ................. G03G 17/04
430/34
10,228,551 B1 * 3/2019 Dietz ................. G01B 11/0608
(Continued)

FOREIGN PATENT DOCUMENTS

EP         2500685       9/2012
GB         2399875       9/2004
(Continued)

OTHER PUBLICATIONS

Pengfei Wang, et al., "The Use of a Fiber Comb Filter Fabricated by a CO2 Laser Irradiation to Improve the Resolution of a Ratiometric Wavelength Measurement System." Journal of Lightwave Technology, vol. 30, No. 8, Apr. 15, 2012, pp. 1143-1149.
(Continued)

*Primary Examiner* — Hina F Ayub
(74) *Attorney, Agent, or Firm* — JCIPRNET

(57) ABSTRACT

The present invention provides a wavelength detection device (10) provided with: a plurality of optical filters (12a, 12b); a splitting unit (11) which splits light and allows the split light to pass through each of the plurality of optical filters (12a, 12b); a plurality of light receiving elements (13a, 13b) which detect the intensities of different beams of light which have passed through the optical filters, respectively; and a calculation unit (16) which calculates, from the outputs of the plurality of light receiving elements, physical quantities related to the transmittances of the plurality of optical filters, and calculates the wavelengths of the beams of light which have passed through the plurality of optical filters, on the basis of the transmittance characteristics, wherein the transmittance characteristics of the plurality of optical filters have an inclination section in different wavelength ranges of the wavelength range of the object to be measured.

9 Claims, 9 Drawing Sheets

(51) Int. Cl.
*G01J 3/36* (2006.01)
*G01J 3/51* (2006.01)

(56) References Cited

U.S. PATENT DOCUMENTS

| | | | |
|---|---|---|---|
| 11,019,316 B1* | 5/2021 | Jia | G01J 3/00 |
| 2005/0180748 A1* | 8/2005 | Kawahata | H04B 10/071 398/16 |
| 2008/0137061 A1* | 6/2008 | Rush | G01B 11/0608 356/4.04 |
| 2008/0265146 A1 | 10/2008 | Coates | |
| 2011/0085173 A1 | 4/2011 | Waller et al. | |
| 2013/0021611 A1* | 1/2013 | Tsurutani | G01J 3/0218 356/416 |
| 2014/0049772 A1 | 2/2014 | Zollars et al. | |

FOREIGN PATENT DOCUMENTS

| | | |
|---|---|---|
| JP | H0658817 | 3/1994 |
| JP | 2002071459 | 3/2002 |
| JP | 2012208102 | 10/2012 |
| JP | 2015227858 | 12/2015 |
| WO | 0054381 | 9/2000 |
| WO | 02075877 | 9/2002 |
| WO | 2008009093 | 1/2008 |

OTHER PUBLICATIONS

"International Search Report (Form PCT/ISA/210)" of PCT/JP2019/010010, dated May 28, 2019, with English translation thereof, pp. 1-4.

"Written Opinion of the International Searching Authority (Form PCT/ISA/237)" of PCT/JP2019/010010, dated May 28, 2019, with English translation thereof, pp. 1-10.

Pengfei Wang et al., "The Use of a Fiber Comb Filter Fabricated By a CO2 Laser Irradiation to Improve the Resolution of a Ratiometric Wavelength Measurement System," Journal of Lightwave Technology, Apr. 2012, pp. 1143-1149.

"Search Report of Europe Counterpart Application", dated Oct. 29, 2021, p. 1-p. 9.

* cited by examiner (a)

(b)

(a)

(b)

(a)

(b)

(a)

(b)

WAVELENGTH DETECTION DEVICE AND CONFOCAL MEASUREMENT DEVICE

CROSS-REFERENCE TO RELATED APPLICATION

This application is a 371 application of the International PCT application serial no. PCT/JP2019/010010, filed on Mar. 12, 2019, which claims the priority benefits of Japan Patent Application No. 2018-044588, filed on Mar. 12, 2018. The entirety of each of the above-mentioned patent applications is hereby incorporated by reference herein and made a part of this specification.

BACKGROUND

Technical Field

The present invention relates to a wavelength detection device that detects the wavelength of light and a confocal measurement device that includes the wavelength detection device.

Related Art

Among measurement devices that measure the displacement of a measurement object without contact, a confocal measurement device that measures the displacement of the measurement object using a confocal optical system is disclosed in patent literature 1. The confocal measurement device disclosed in patent literature 1 has a white LED 21, a diffractive lens 1 that generates chromatic aberration in the light emitted from the white LED 21 along the optical axis direction, an objective lens 2 which is arranged closer to the measurement object 200 side than the diffractive lens 1 and which condenses the light having the chromatic aberration generated by the diffraction lens 1 on the measurement object 200, a pinhole that allows the light focused in the measurement object 200 among the light condensed by the objective lens 2 to pass through, and a wavelength measurement portion that measures the wavelength of the light that has passed through the pinhole. The focal length of the diffractive lens 1 is set to be longer than the difference between the distance from the diffractive lens 1 to the objective lens 2 and the focal length of the objective lens 2.

Further, in an optical wavelength monitor device disclosed in patent literature 2, incident light 100 of an optical signal is distributed into a plurality of lights by an optical distributor 101, and a part of the distributed plurality of lights is transmitted through an optical filter 103 having different transmission ratios due to the incident wavelengths, and the transmitted light and the non-transmitted light that does not pass through the optical filter 103 are received by the light receivers 105 and 107 to be converted into voltage signals. Subsequently, the comparison calculator 109 calculates the ratio of the light intensities of the transmitted light and the non-transmitted light based on the voltage signals, and calculates the wavelength of the incident light 100 based on the intensity ratio.

In the confocal measuring device described in patent literature 1, the displacement is measured using a diffraction grating and a line CMOS. However, when the line CMOS is used, it takes a long time to read out the CMOS information, which causes a problem that the measurement time becomes long. From the point above, it is advantageous to adopt a spectroscopic method using an optical filter.

On the other hand, the basic principle of the optical wavelength monitor device described in patent literature 2 can be explained as shown in FIG. 9. That is, in the optical wavelength monitor, the incident light is divided into a plurality of lights by the optical distributor 101 such as an optical filter. Then, one of the lights passes through the optical filter 103 in which the relationship between the wavelength of light and the transmittance is known, and the intensity is detected by the light receiver 107. The intensity of the other light is detected by the light receiver 105 without passing through an optical filter. Then, for example, by dividing the output of the light receiver 107 by the output of the light receiver 105, the transmittance T of the light is derived. The wavelength of the incident light is derived from the derived transmittance T of the light and the known relationship between the wavelength of the light and the transmittance as shown in (b) of FIG. 9.

However, in the technique, the wavelength detection precision σ can be expressed by the following equation (1).

[Mathematical formula 1]

$$\sigma = \frac{1}{SN}\sqrt{T^2+1}\left(\frac{dT}{d\lambda}\right)^{-1} \qquad (1)$$

Here, SN is the SN ratio of the light receiver without any optical filter, T is the transmittance, and λ is the wavelength. That is, the precision of wavelength detection is inversely proportional to the inclination (dT/dλ) of the change in the transmittance T with respect to the change in the wavelength λ in the optical filter 103. Therefore, if (dT/dλ) is increased to improve the precision of wavelength detection, the measurable range of the wavelength would become narrow, and it is difficult to balance the measurable range of wavelength.

LITERATURE OF RELATED ART

Patent Literature

Patent literature 1: Japanese Patent Laid-Open No. 2012-208102
Patent literature 2: Japanese Patent Laid-Open No. 2002-71459
Patent literature 3: Japanese Patent Laid-Open No. 06-58817

SUMMARY

Problems to be Solved

The present invention is accomplished based on the above described problems, and the purpose of the present invention is to provide a technique capable of maintaining a wide wavelength range to be measured and enhancing wavelength detection precision in a wavelength detection device using a spectroscopic method employing an optical filter.

Means to Solve the Problems

The present invention for solving the above described problems is a wavelength detection device, including:
a plurality of optical filters;
a splitting unit which splits light and allows the split lights to pass through the plurality of optical filters;
a plurality of light receiving elements which detect the intensities of the lights which have passed through each of the plurality of optical filters or are reflected by each of the plurality of optical filters; and a calculation portion which derives a physical quantity related to the transmittances of the plurality of optical filters from the outputs of the plurality of light receiving elements, and derives the wavelengths of the lights which have passed through the plurality of optical filters on the basis of the transmittance characteristic which is a relationship between the physical quantity related to the transmittance and the wavelength of the light for the plurality of optical filters; wherein the transmittance characteristic of each of the plurality of optical filters has an inclination portion in different wavelength ranges of the wavelength range to be measured.

As described above, the wavelength detection device of the present invention divides light and allows the split lights to pass through the plurality of optical filters or be reflected by the plurality of optical filters. Then, the plurality of light receiving elements detect the intensities of the lights that have passed through each of the plurality of optical filters or reflected by each of the plurality of optical filters. Then, the calculation portion derives a physical quantity related to the transmittances of the plurality of optical filters from the outputs of the plurality of light receiving elements, and derives the wavelengths of the lights which have passed through the plurality of optical filters on the basis of the known transmittance characteristics of the plurality of optical filters.

Here, in the present invention, the transmittance characteristic of each optical filter has an inclination portion in different wavelength ranges of the wavelength range to be measured. That is, the plurality of optical filters as a whole have as many inclination portions as the number of the optical filters in different wavelength ranges of the wavelength range to be measured.

Thus, as the device, it is possible to detect the wavelength of light by using the plurality of inclination portions in the transmittance characteristic arranged in different wavelength ranges. Accordingly, as compared with the case where the wavelength is detected by using the transmittance characteristic having a single inclination portion with respect to the wavelength range to be measured, a wide wavelength range to be measured can be maintained and the inclination angle of the inclination portion can be steeper. Then, the wavelength value can be more clearly specified by detecting the wavelength using the steeper inclination portion in the transmittance characteristic. As a result, it is possible to further improve the precision of wavelength detection.

In addition, in the present invention, the physical quantity related to the transmittance may be transmittance or reflectance. Besides, the physical quantity related to the transmittance may be a value obtained by dividing the light amount or light intensity after passing through the optical filter by the light amount or light intensity before passing through the optical filter, or may be a value obtained by logarithmically converting the light amount or light intensity before passing through the optical filter and the light amount or light intensity after passing through the optical filter respectively and taking the difference. Alternatively, the physical quantity related to the transmittance may be a value obtained by dividing the light amount or light intensity after being reflected by the optical filter by the light amount or light intensity before being reflected by the optical filter, or may be a value obtained by logarithmically converting the light amount or light intensity before being reflected by the optical filter and the light amount or light intensity after being reflected by the optical filter respectively and taking the difference. Further, the physical quantity related to the transmittance may be a value obtained by adding a predetermined calculation to the result obtained by each of the above calculations. Further, the physical quantity may be a value derived by another calculation method as long as the value has an equivalent technical meaning. Furthermore, the light amount or light intensity before passing through the optical filter or being reflected by the optical filter may be substituted with an equivalent value obtained by another method, such as the light amount or light intensity after passing through the transparent plate.

In addition, in the present invention, the physical quantity related to the transmittance may be transmittance, and in the transmittance characteristic for each of the plurality of optical filters, the transmittance of each of the optical filters may change between approximately 0 and approximately 1 in the inclination portion. In this way, the steeper inclination portion can be more reliably distributed in the range of 0 to 1 of the transmittance, and it is possible to detect the wavelength more reliably by using the steeper inclination portion with respect to the light of any wavelength of the wavelength range to be measured.

In addition, in the present invention, the physical quantity related to the transmittance may be transmittance, and the absolute value of at least one inclination of the inclination portion may be 0.0033 (1/nm) or more. The reason is that it is possible to obtain sufficient wavelength detection precision thereby according to the examination using the above described equation (1). Further, in the present invention, it is more preferable that the absolute value of at least one inclination of the inclination portion is 0.0053 (1/nm) or more.

In addition, in the present invention, the inclination portion in the transmittance characteristic of each of the plurality of optical filters may be arranged so as to cover the wavelength range to be measured without any gap. Thus, even if the light of any wavelength of the wavelength range to be measured is incident, any of the above described inclination portions can be used more reliably. Therefore, it is possible to more reliably improve the wavelength detection precision.

In addition, in the present invention, among the transmittance characteristics of each of the plurality of optical filters, two or more of the transmittance characteristics consist of curves that periodically change in the wavelength range to be measured and the curves related to each of the transmittance characteristics may have different phases. Thus, first, it is possible to distribute the inclination portion uniformly with respect to the wavelength range to be measured, and to detect the wavelength when the light of any wavelength in the wavelength range to be measured is incident. In addition, because there is always a portion where the inclination is gentle or horizontal at the top or the bottom in the curve that changes periodically, in this case, it is possible to precisely detect the wavelength of light by using the inclination portion of the transmittance characteristic of another optical filter with a different phase to detect the wavelength.

In addition, in the present invention, the transmittance characteristics of each of the plurality of optical filters may further include a transmittance characteristic consisting of a straight line or a curve that monotonically increases or monotonically decreases in the wavelength range to be measured. That is, when a curve that periodically changes in the wavelength range to be measured is used as the transmittance characteristic, the wavelength can be detected for any wavelength in the wavelength range to be measured, but when the physical quantity related to the specified transmittance is obtained, it may be difficult to determine that the physical quantity related to the transmittance is due to the inclination portion of which cycle. In this case, by using the transmittance characteristic consisting of a straight line or a curve that monotonically increases or monotonically decreases in the wavelength range to be measured, it is possible to more reliably determine that the physical quantity related to the transmittance is due to the inclination portion of which cycle, and it is possible to more reliably detect the wavelength of the incident light.

In addition, in the present invention, the plurality of optical filters may be configured by dividing one filter plate into a plurality of regions having different transmittance characteristics, and at least one of the plurality of regions having different transmittance characteristics may be formed of a transparent plate. In the case, it is possible to achieve the function as a splitting unit for splitting the incident light by directly irradiating the filter plate divided into a plurality of regions with the incident light. Further, it is possible to form a plurality of optical filters on one filter plate. As a result, it is possible to reduce the number of parts and facilitate the device configuration.

In addition, in the present invention, the plurality of light receiving elements may be arranged on the same substrate so as to be able to respectively receive the light transmitted through the plurality of regions. Thus, it is possible to more reliably reduce the number of parts and facilitate the device configuration by combining the plurality of the light receiving elements with the plurality of optical filters formed on the filter plate.

In addition, in the present invention, the intensity of the light entering the plurality of optical filters and the transparent plate may be non-uniform. Here, it is known that by obtaining non-uniform intensity of the light which enters the plurality of optical filters and the transparent plate, even in the case that noise is contained in the output of each light receiving element, it is possible to reduce variation in the physical quantity related to the obtained transmittance. That is, in the present invention, the influence of noise can be reduced by obtaining non-uniform intensity of the light which enters each optical filter and the transparent plate. Thus, it is also possible to detect the wavelength more accurately.

In addition, the present invention may be a confocal measurement device, including:

a light source that emits light of a plurality of wavelengths;

a chromatic aberration imparting unit for generating chromatic aberration in the light emitted from the light source along an optical axis direction;

an objective lens for condensing the light having chromatic aberration generated by the chromatic aberration imparting unit on an measurement object;

a pinhole that allows the light focused on the measurement object in the light condensed by the objective lens to pass through; and the wavelength detection device aforementioned;

wherein the confocal measurement device measures a displacement of the measurement object from the wavelength of the light that has passed through the pinhole.

Accordingly, it is possible to provide a confocal measurement device that can detect the wavelength of the incident light with higher precision and thus can measure the displacement of the measurement object more precisely. In addition, because it is not necessary to use a diffraction grating for detecting the wavelength of the incident light, the device can be downsized and the cost can be reduced.

Effect

According to the present invention, in a wavelength detection device using a spectroscopic method employing an optical filter, it is possible to maintain a wide wavelength range to be measured and improve wavelength detection precision.

DESCRIPTION OF THE EMBODIMENTS

Application Example

Figure 1:
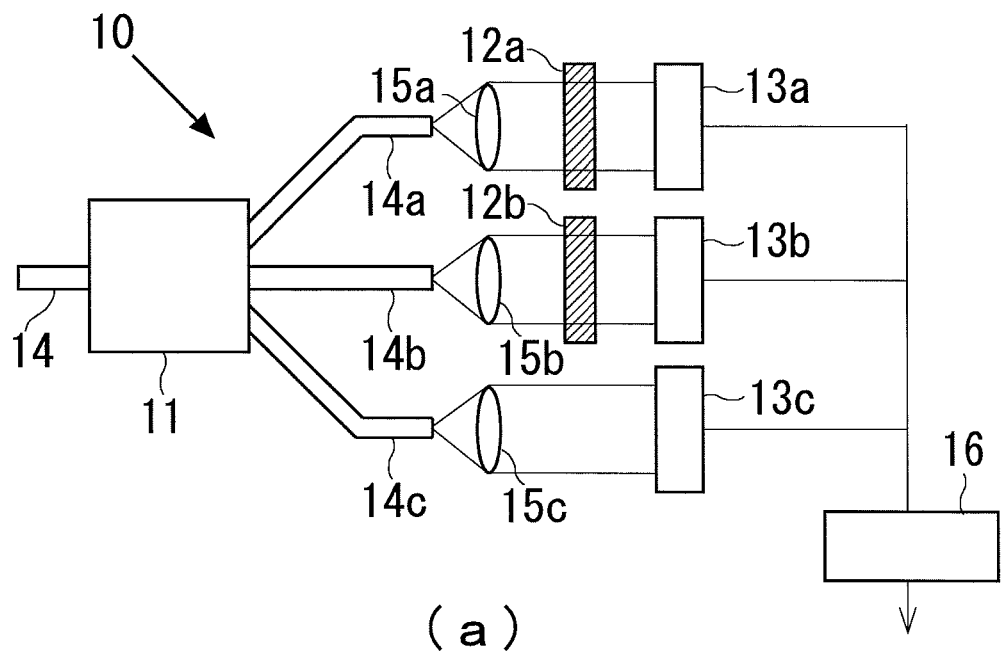
FIG. 1 shows a schematic configuration of a wavelength detection device and a transmittance characteristic of each filter according to an application example of the present invention.

Next, an application example of the present invention is described with reference to the drawings. As shown in FIG. 1, in a wavelength detection device 10 of the present application example, the light which enters an incident light fiber 14 is branched into a first branching fiber 14a, a second branching fiber 14b, and a third branching fiber 14c by a branching coupler 11 serving as a splitting unit. Then, the light emitted from each of the first branching fiber 14a, the second branching fiber 14b and the third branching fiber 14c is respectively converted into parallel rays by a first condenser lens 15a, a second condenser lens 15b, and a third condenser lens 15c.

The light that has passed through the first condenser lens 15a passes through a first filter 12a and then is received by a first light receiving element 13a, and the intensity thereof is converted into an electric signal. Similarly, the light that has passed through the second condenser lens 15b passes through a second filter 12b and then is received by a second light receiving element 13b, and the intensity thereof is converted into an electric signal. The light that has passed through the third condenser lens 15c is directly received as reference light by a third light receiving element 13c, and the intensity thereof is converted into an electric signal.

Then, in a calculation device 16 serving as a calculation portion, the intensity of the light received by the first light receiving element 13a is divided by the intensity of the light received by the third light receiving element 13c, and thereby the transmittance of the first filter 12a is calculated and derived. In addition, the intensity of the light received by the second light receiving element 13b is divided by the intensity of the light received by the third light receiving element 13c, and thereby the transmittance of the second filter 12b is calculated and derived.

(b) of FIG. 1 shows a relationship between the transmittance and the wavelength of the first filter 12a and the second filter 12b (hereinafter, also referred to as transmittance characteristic). As shown in (b) of FIG. 1, the first filter 12a has a characteristic that the transmittance sharply changes from 1 to 0 in the wavelength range of 500 nm to 575 nm, and has a characteristic that all the light is allowed to pass through when the wavelength is shorter than 500 nm (transmittance 1) and no light is allowed to pass through when the wavelength is longer than 575 nm (transmittance 0). On the other hand, the second filter 12b has a characteristic that the transmittance sharply changes from 1 to 0 in the wavelength range of 575 nm to 650 nm, and has a characteristic that all the light is allowed to pass through when the wavelength is shorter than 575 nm (transmittance 1) and no light is allowed to pass through when the wavelength is longer than 650 nm (transmittance 0).

Then, in the wavelength detection device 10, the calculation device 16 detects the wavelength of the incident light according to the transmittance of the light that has passed through the first filter 12a and the transmittance of the light that has passed through the second filter 12b. In the example of (b) of FIG. 1, the transmittance of the light that has passed through the first filter 12a is 0, and the transmittance of the light that has passed through the second filter 12b is 0.5. Then, the wavelength $\lambda$ at which the transmittance of the light that has passed through the second filter 12b is 0.5 is derived. More specifically, the calculation device 16 has a table storing a relationship between the wavelength $\lambda$, the transmittance of the first filter 12a, and the transmittance of the second filter 12b, the relationship corresponding to the graph of (b) of FIG. 1. The wavelength 2 of the incident light is derived according to the table and the values of the transmittance of the light that has passed through the first filter 12a and the transmittance of the light that has passed through the second filter 12b.

In the application example, two filters which have transmittance characteristics of having steep inclinations with respect to changes in wavelength in different wavelength ranges of 500 nm to 575 nm and 575 nm to 650 nm are used to detect the wavelength of the incident light. Therefore, it is possible to detect the wavelength in a wide wavelength range of 500 nm to 650 nm by utilizing steep transmittance characteristic. Moreover, in the above application example, the branching coupler 11 splits the incident light into three lights. Besides, the wavelength range to be measured is measured by using transmittance characteristics of two types of filters, but the number of the filter is not limited to two. The number of the filter may be three types or more.

In addition, in the above application example, the absolute value of the inclination is 0.0133 (1/nm), which is a sufficiently steep inclination. In addition, because the transmittance characteristic of the first filter 12a and the transmittance characteristic of the second filter 12b are arranged without any gap with respect to the wavelength, the wavelength detection is possible with respect to the light having any wavelength in the wavelength range (500 nm to 650 nm) to be measured. Furthermore, because the transmittance characteristic of the first filter 12a and the transmittance characteristic of the second filter 12b are distributed from 0 to 1 with respect to the transmittance, a steeper transmittance characteristic can be easily realized.

Next, a confocal measurement device 50 including the wavelength detection device 10 of the present invention is described.

Figure 2:
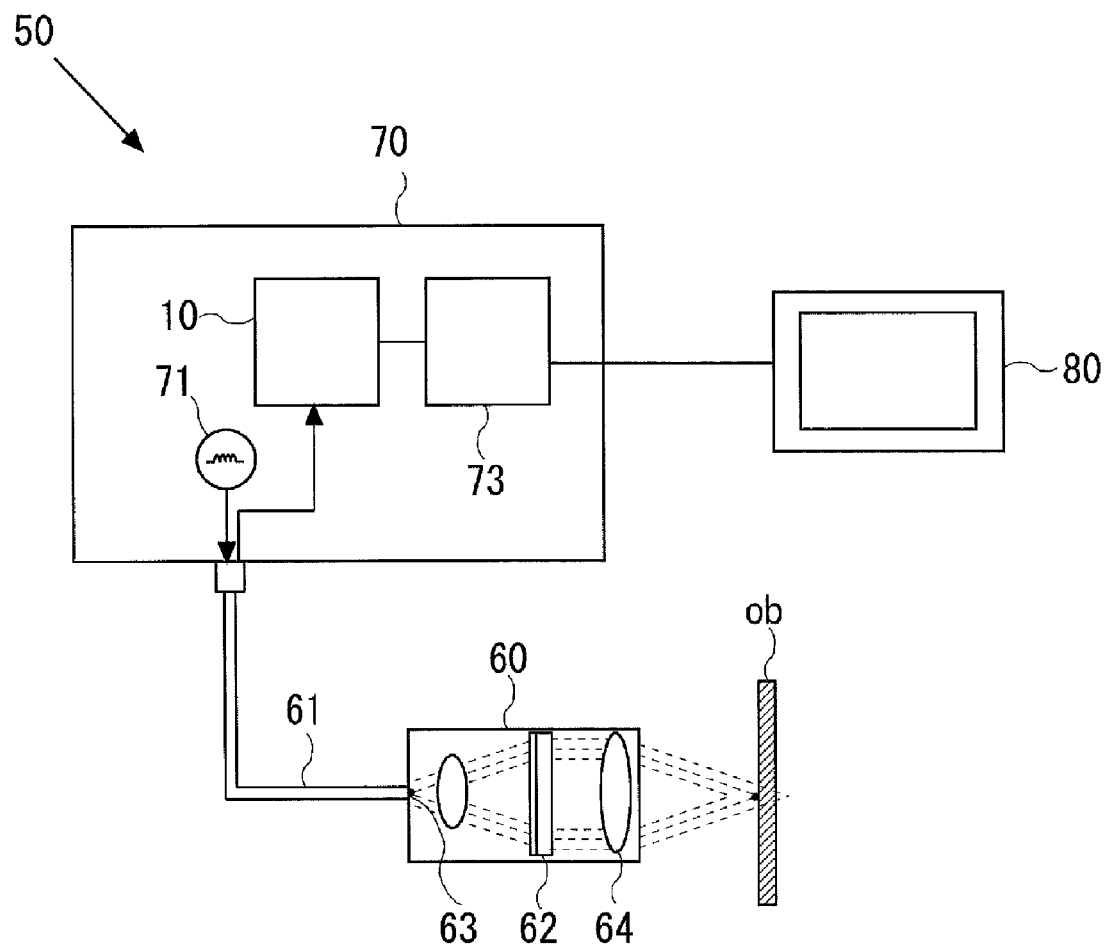
FIG. 2 is a diagram showing a schematic configuration of a confocal measurement device according to an application example of the present invention.

FIG. 2 is a schematic diagram showing the configuration of the confocal measurement device 50 including the wavelength detection device 10. The confocal measurement device 50 shown in FIG. 2 is a measurement device that measures the displacement of the measurement object ob by using a confocal optical system. The confocal measuring device 50 includes a head portion 60 having a confocal optical system, a controller portion 70 optically connected through a light fiber 61, and a monitor portion 80 displaying a signal output from the controller portion 70. The head portion 60 has a diffractive lens 62 serving as a chromatic aberration imparting unit, and generates chromatic aberration along the optical axis direction in the light emitted from a light source 71 described later (for example, a white light source) that emits lights of a plurality of wavelengths. Then, the light having the chromatic aberration generated by the diffractive lens is condensed on the measurement object ob by an objective lens 64.

The light emitted from the light source 71 arranged in the controller portion 70 is guided to the head portion 60 through the light fiber 61. The light fiber 61 is a light path from the head portion 60 to the controller portion 70 and also functions as a pinhole 63. That is, among the light condensed by the head portion 60, the light focused on the measurement object ob is focused on the opening portion of the light fiber 61. Therefore, the light fiber 61 functions as the pinhole 63 that blocks light having a wavelength that is not focused on the measurement object ob and allows light that is focused on the measurement object ob to pass through. By using the light fiber 61 in the light path from the head portion 60 to the controller portion 70, it is not necessary to separately arrange a pinhole.

The confocal measurement device 50 may has a configuration in which a pinhole is separately arranged in the light path from the head portion 60 to the controller portion 70 without using the light fiber 61. The controller portion 70 includes the light source 71, which is a white light source, and the wavelength detection device 10. A white LED can be illustrated as an example of the light source 71, and another light source may be illustrated as long as it is a light source that can emit white light.

That is, in the confocal measurement device 50, chromatic aberration is given to the light having a plurality of wavelengths emitted from the light source 71 in the diffractive lens 62 of the head portion 60, and an image is formed on the measurement object ob. Only the light of the wavelength at which an image is accurately formed on the measurement object ob passes through the opening of the light fiber 61 also serving as the pinhole 63, and reaches the controller portion 70 through the light fiber 61. Then, the wavelength is detected by the wavelength detection device 10. Besides, the controller portion 70 is provided with a displacement calculation portion 73 having a table of the relationship between the wavelength of the reflected light from the measurement object ob and the displacement of the measurement object ob. The displacement of the measurement object ob is calculated according to the wavelength measured by the wavelength detection device 10, and the monitor portion 80 displays the result.

Because the confocal measurement device 50 in the present application example includes the wavelength detection device 10 of the present invention, it is possible to more precisely measure the wavelength of the light imaged and reflected on the measurement object ob. As a result, it is possible to more precisely measure the displacement of the measurement object ob. In addition, the wavelength detection device used in the confocal measurement device 50 is not limited to the wavelength detection device described in the application example, and may be wavelength detection devices described in following embodiment examples.

Example 1

Next, Example 1 of the present invention is described. In the present example, an example is described in which a plurality of filters having different transmittance characteristics are formed on one filter plate, and as for the light receiving element, split light receiving elements obtained by arranging a plurality of light receiving elements on one substrate are used, thereby the structure is further simplified and the number of the inclination portion in the wavelength range to be measured is increased.

Figure 3:
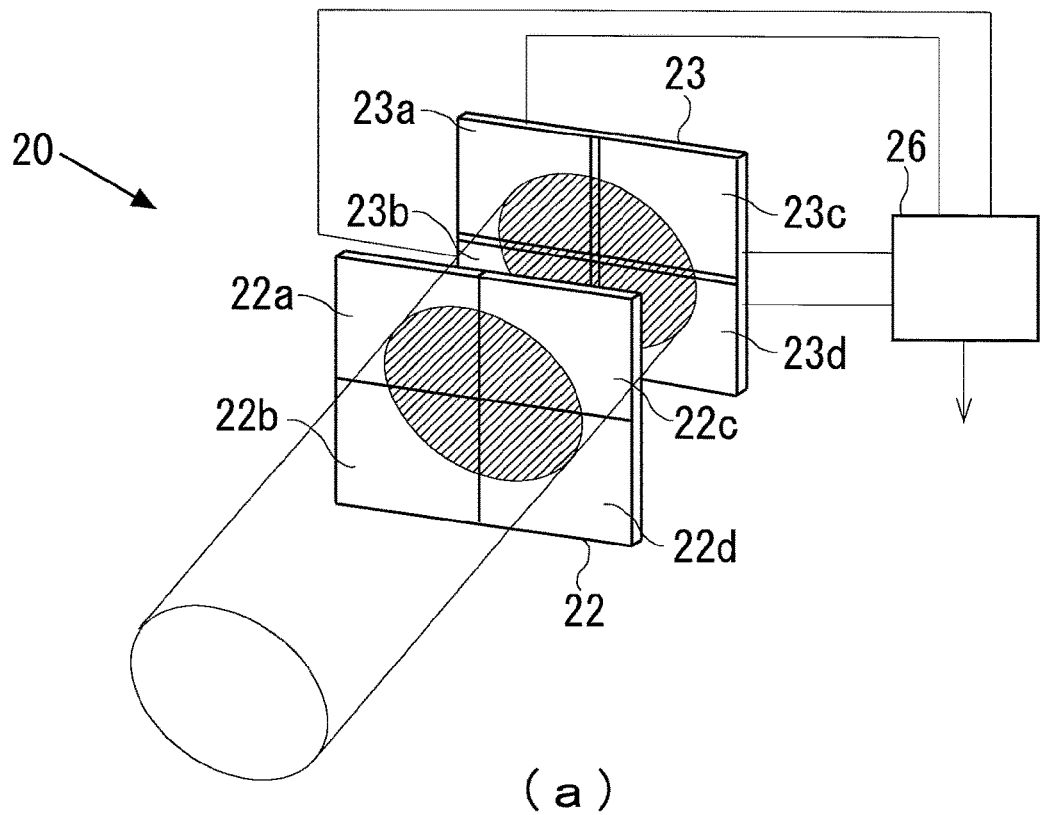
FIG. 3 shows a schematic configuration of a wavelength detection device and a transmittance characteristic of each filter according to Example 1 of the present invention.
Figure 3:
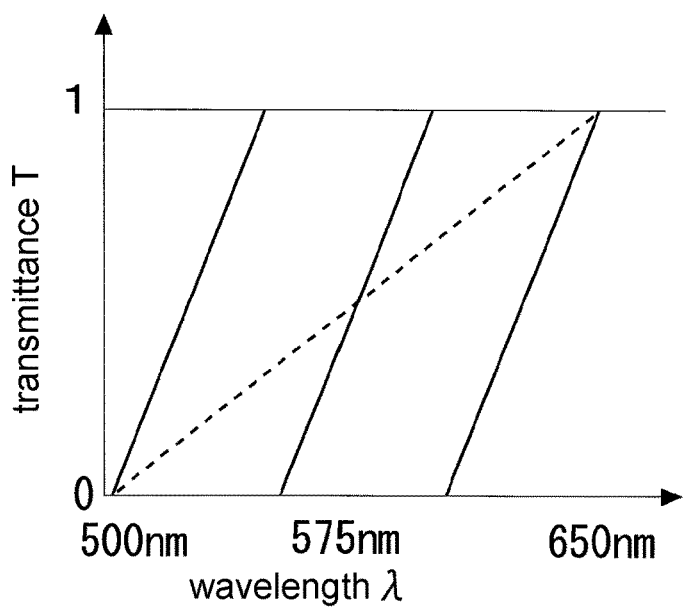

The configuration of the wavelength detection device 20 in the present example is shown in FIG. 3. In the present example, the incident light is parallelized by a collimator lens that is not shown. Then, the incident light enters a four-division filter 22 without using a branching coupler. In the four-division filter 22, the incident surface of the filter is divided into four, and filters 22a to 22c having three types of different transmittance characteristics and a transparent plate 22d that allows light of all wavelengths in the wavelength range to be measured to pass through are formed. Then, the light that has been parallelized enters and passes through the four-division filter 22 in a manner of evenly entering the filters 22a to 22c and the transparent plate 22d. Then, in each of light receiving elements 23a to 23d of a four-division light receiving element 23 which is arranged on the rear side, the intensity of the light that has passed through the filters 22a to 22c and the transparent plate 22d is measured.

Then, in the calculation device 26 serving as the calculation portion, the intensity of the light received by the light receiving elements 23a to 23c is divided by the intensity of the light received by the light receiving element 23d, and thereby the transmittance of the light that has passed through the filters 22a to 22c is calculated and derived. Furthermore, in the calculation device 26, the wavelength of the incident light is detected according to the transmittance of the light that has passed through the filters 22a to 22c and the known transmittance characteristic of the filters 22a to 22c. Further, the filters 22a to 22c may be formed on a transparent substrate by evaporation or the like, or may be formed by a color glass filter or a multilayer film filter. Further, in the present example, the filters 22a to 22c and the transparent plate 22d correspond to a plurality of regions. In addition, the configuration in which the light that has been parallelized enters the four-division filter 22 in a manner of evenly entering the filters 22a to 22c and the transparent plate 22d corresponds to the splitting unit.

Here, (b) of FIG. 3 shows the transmittance characteristic of the filters 22a to 22c. In the four-division filter 22, the transmittance characteristic of the filter 22a has a steep inclination portion with respect to the wavelength range of 500 nm to 550 nm. The transmittance characteristic of the filter 22b has a steep inclination portion with respect to the wavelength range of 550 nm to 600 nm. The transmittance characteristic of the filter 22c has a steep inclination portion with respect to the wavelength range of 600 nm to 650 nm. Besides, in each wavelength range, the transmittances of the filters 22a to 22c change from 0 to 1. Thus, in the four-division filter 22 of the present example, the transmittance characteristic of each of the three filters 22a to 22c has an inclination portion in different wavelength ranges. Further, the absolute value of the inclination of each inclination portion is 0.02 (1/nm), which is sufficiently large, and it is possible to detect the wavelength of light precisely.

Alternatively, if the transmittance characteristic of each of the filters 22a to 22c is set to be gentler, it is possible to detect the wavelength of light in a wider wavelength range.

Figure 4:
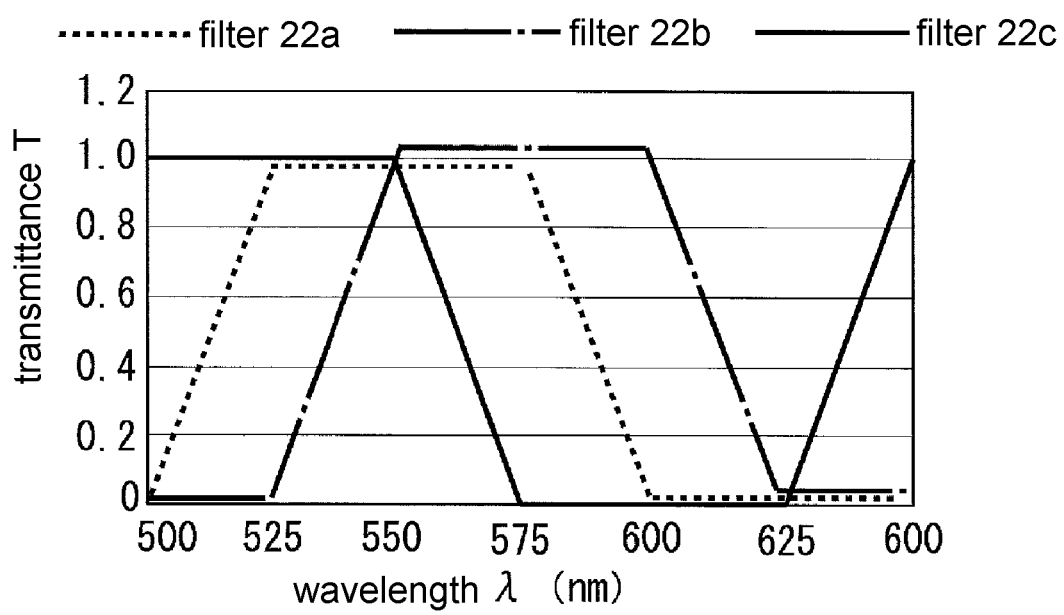
FIG. 4 is a diagram showing another example of the transmittance characteristic of each filter according to Example 1 of the present invention.

Next, FIG. 4 shows another example of the transmittance characteristic of the filters 22a to 22c to be used in the wavelength detection device 20. In the present example, in the transmittance characteristic of each of the filters 22a to 22c of the four-division filter 22, the inclination portion when the transmittance increases from 0 to 1, and the inclination portion when the transmittance decreases from 1 to 0 are arranged. Accordingly, it is possible to arrange as many inclination portions as twice the number of filters with respect to the wavelength range to be measured. Then, as shown in FIG. 4, more inclination portions can be distributed in the wavelength range to be measured, and it is possible to further increase the measurement precision in the wavelength range.

In addition, as shown in FIG. 4, the transmittance characteristic of the filters 22a to 22c in this case has a flat portion at the peak or the bottom. For example, in the transmittance characteristic of the filter 22a, in the range of 525 nm to 575 nm, there is a portion where the transmittance does not change regardless of the change in wavelength. In the portion, it becomes impossible to detect the wavelength of light from the transmittance of the filter 22a. In contrast, in the present example, due to the inclination portion of the transmittance characteristic of the filter 22b, it is possible to detect the wavelength of light in the wavelength range of 525 nm to 550 nm, and due to the inclination portion of the transmittance characteristic of the filter 22c, it is possible to detect the wavelength of light in the wavelength range of 550 nm to 575 nm. As described above, in the example, at least one of the transmittance characteristics of the three filters 22a to 22c has an inclination portion in the wavelength range to be measured. Therefore, it is possible to detect any wavelength with high precision.

In addition, the filters 22a to 22d in the present example may be installed on the surface of the four-division light receiving element 23, or may be formed directly on the surface of the four-division light receiving element 23 by a method such as evaporation. Further, in the present example, the number of the filter is four including the transparent plate, but the number of the filter is not limited to four. For example, the number of the filter may be three or may be five or more.

Example 2

Next, Example 2 of the present invention is described. In the present example, an example is described in which a four-division filter is used as in the case of Example 1 and the transmittance characteristic of each filter is selected according to the intensity distribution for each wavelength in the light source.

Because the hardware configuration of the present example is the same as that of the wavelength detection device 20 of Example 1, the same symbols are used and the description thereof is omitted. Besides, in the present example, the transmittance characteristic of each of the filters 22a to 22c of the four-division filter 22 is as shown in (a) of FIG. 5. In the present example, the filter 22a has a relatively steep inclination portion in the wavelength range of 500 nm to 535 nm. In addition, the filter 22b has a relatively gentle inclination in the wavelength range of 535 nm to 620 nm. Furthermore, the filter 22c has a relatively steep inclination portion in the wavelength range of 620 nm to 650 nm.

Figure 5:
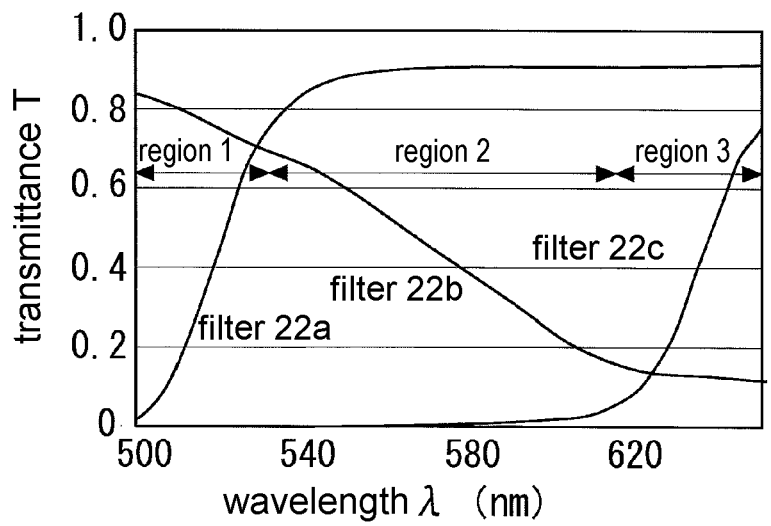
FIG. 5 shows a transmittance characteristic of each filter and an intensity distribution for each wavelength of a light source according to Example 2 of the present invention.
Figure 5:
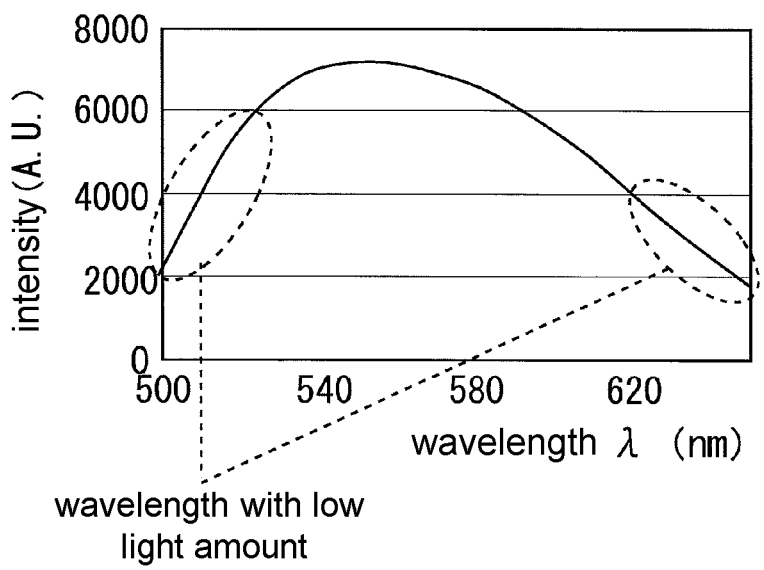

(b) of FIG. 5 shows the intensity distribution of each wavelength of the light source in the wavelength detection device 20. In the intensity distribution, the light intensity is particularly weak in the wavelength range of 520 nm or less and the wavelength range of 620 nm or more. Thus, there is a risk that the SN ratio of the light receiving element 23 becomes low in the wavelength ranges described above.

In contrast, in the present example, by setting the transmittance characteristic of each filter to be the transmittance characteristic as shown in (a) of FIG. 5, there is a particularly steep inclination portion in the wavelength range of 535 nm or less and the wavelength range of 620 nm or more, and the deterioration in the measurement precision of wavelength detection in this portion is suppressed.

As described above, in the present example, by determining and combining inclinations of the transmittance characteristics of the filters 22a to 22c of the four-division filter 22 according to the intensity distribution of each wavelength in the light source, it is possible to detect the wavelength with high precision and little fluctuation in precision regardless of the intensity distribution of the light source.

Example 3

Next, Example 3 of the present invention is described. In the present example, as in Example 2, the hardware configuration is the same as that of the wavelength detection device 20 described in Example 1. In the present example, an example is described in which the filter has a transmittance characteristic that periodically changes in the wavelength range to be measured.

Figure 6:
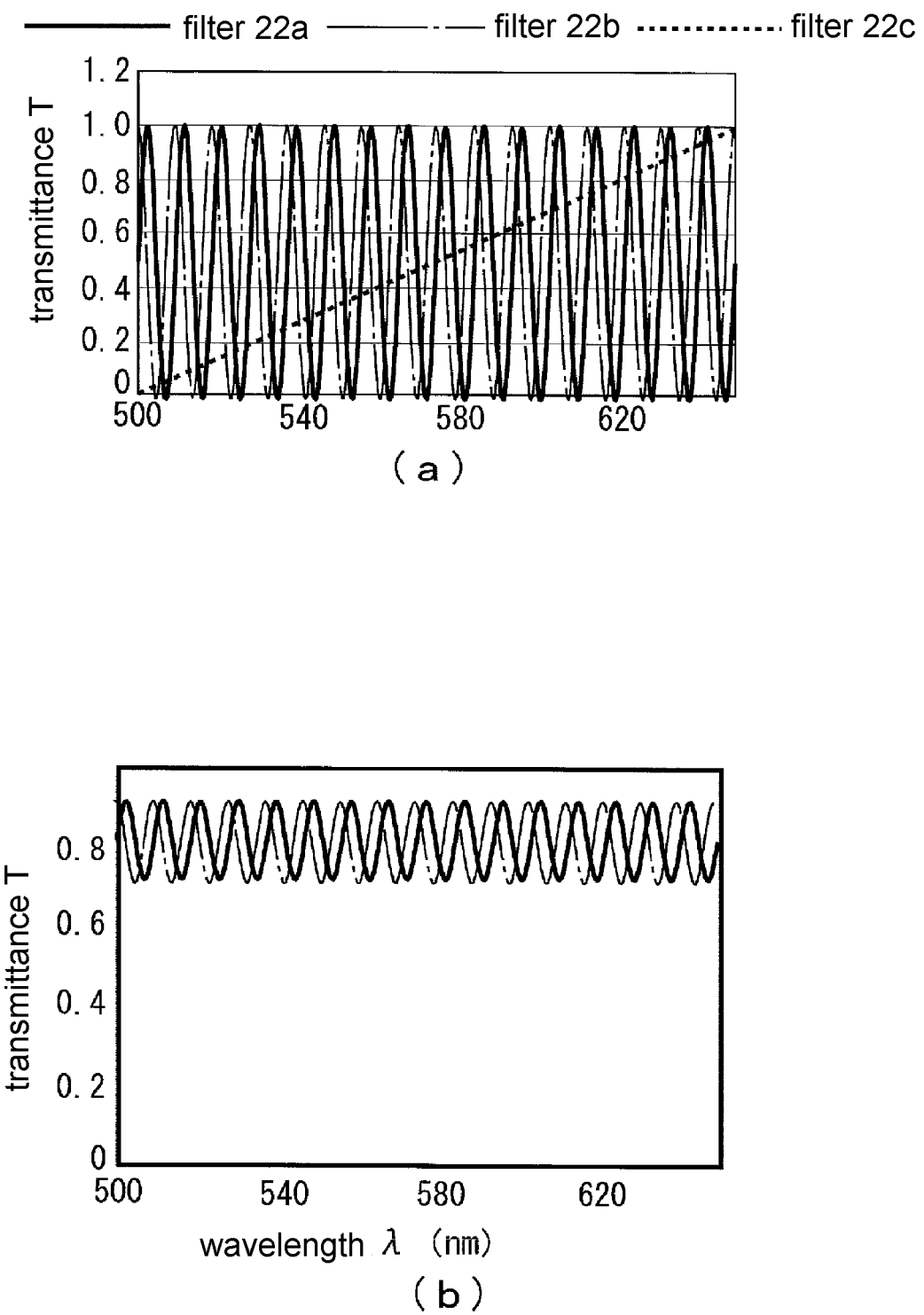
FIG. 6 shows a transmittance characteristic of each filter according to Example 3 of the present invention.

The transmittance characteristics of the filters 22a to 22c of the filter 22 in the present example are shown in FIG. 6. In the present example, the filter 22a and the filter 22b both have a transmittance characteristic in which periodical changes with phases different from each other are made with respect to the change in wavelength. Thus, it is possible to arrange a large number of extremely steep inclination portions in the wavelength range to be measured, and to detect the wavelength with higher precision. Further, because the changes in the transmittance characteristics of the filter 22a and the filter 22b differ in phase from each other, in the wavelength range where the transmittance characteristic of one of the filter 22a and the filter 22b has a small or flat inclination at the peak or the bottom, the transmittance characteristic of the other of the filter 22a or the filter 22b has a steep inclination portion, and it is possible to perform precise wavelength detection by using the transmittance characteristic of either the filter 22a or the filter 22b.

Further, in the present example, the transmittance characteristic of the filter 22c has a characteristic of gently and linearly increasing in the wavelength range to be measured. That is, because the transmittance characteristics of the filter 22a and the filter 22b change periodically, it becomes difficult to determine on which number of cycle of the inclination portion is the transmittance based. At this time, by measuring the transmittance in combination with the transmittance of the filter 22c, it is possible to determine whether the transmittance is measured based on which number of cycle of the inclination portion.

As described above, in the present example, first, because the transmittance characteristics having periodic and steep inclination portions are adopted in two filters, it is possible to distribute a larger number of inclination portions in the wavelength range to be measured, and it is possible to improve the wavelength detection precision. In addition, a phase difference is arranged in the periodic transmittance characteristics of the two filters, and in the wavelength range where the transmittance characteristic of one filter has a small or flat inclination at the peak or the bottom, the transmittance characteristic of the other filter has an inclination portion. Furthermore, by combining with a filter that has a transmittance characteristic that monotonously decreases or monotonically increases gently in the wavelength range to be measured, it is possible to determine whether the transmittance is measured based on which cycle of the inclination portion. According to the above, it is possible to detect the wavelength in a wider wavelength range with higher precision.

(b) of FIG. 6 shows a simulation result of actual transmittance characteristics of the filter 22a and the filter 22b. As described above, it is known that as the actual transmittance characteristic of the filter, a characteristic that periodically changes can be sufficiently realized. The filter can be realized by using an etalon or the like constructed according to the principle of Fabry-Perot interferometer.

Figure 7:
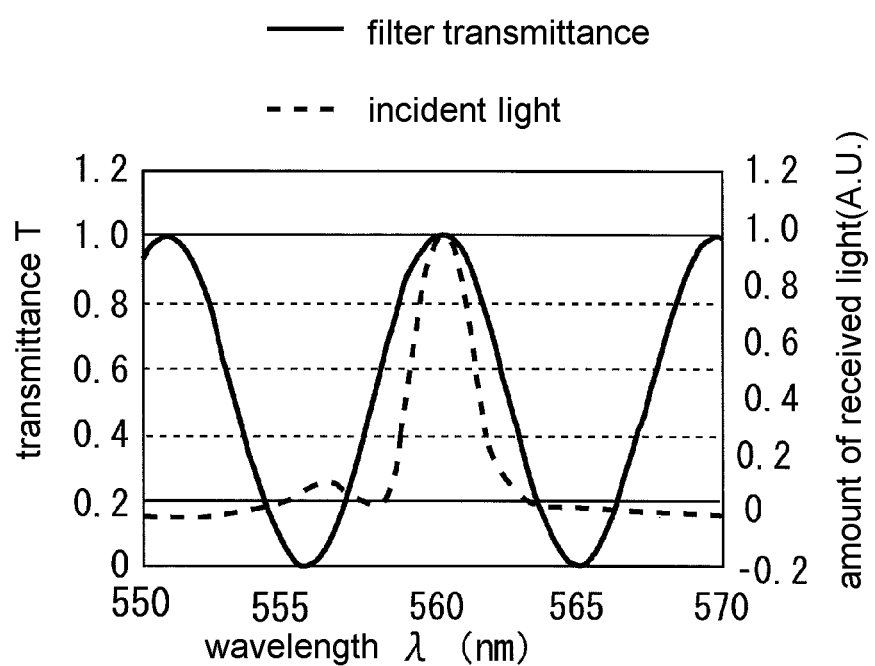
FIG. 7 is a diagram showing a relationship between the transmittance characteristic and a wavelength distribution in a light source according to the Example 3 of the present invention.

Further, it is desirable that the half width at the peak portion of the transmittance characteristic of the filter in the present example is larger than the half width of the wavelength distribution of the light source, as shown in FIG. 7. Otherwise, the wavelength distribution of the light source is applied to an adjacent cycle in the transmittance characteristic of the filter, and it is difficult to perform accurate measurement. By satisfying the condition, it becomes possible to perform more precise wavelength measurement even if the light source has a certain wavelength distribution.

Moreover, the transmittance characteristic that periodically changes in the present example may be a sinusoidal change, a trapezoidal change or a triangular wave change. Even in a case that the triangular wave change is adopted as the transmittance characteristic, a sharp change may not always be achieved at the top or the bottom, and thus phases of periodic changes in transmittance characteristics of two filters should be different. Further, in the present example, the waveform or the cycle of the transmittance characteristics of the two filters may be changed.

Example 4

Next, Example 4 of the present invention is described. In the present example, the hardware configuration is also the same as that of the wavelength detection device 20 described in Example 1. In the present example, an example is described in which the four-division filter 22 is used and the entering of the incident light is made non-uniform with respect to the four filters 22a to 22d.

Here, in a case where the wavelength detection is performed by the wavelength detection device 20, when the light enters toward the direction or the opposite direction of the transparent plate 22d with shifting from the center of the four-division filter 22, the precision of the wavelength detection can be expressed as in equation (2) below.

[Mathematical formula 2]

$$\sigma_\lambda = \sigma_T \left|\frac{dT}{d\lambda}\right|^{-1} = \frac{1}{SN}\sqrt{1/\alpha^2 + T^2}\left|\frac{dT}{d\lambda}\right|^{-1} \quad (2)$$

Here, $\sigma_\lambda$ represents the wavelength detection precision, and $\sigma_T$ represents the variation in transmittance. In addition, $\alpha$ is a light amount division ratio which is a ratio between the light amount applied to the filter 22a and the light amount applied to the transparent plate 22d (light amount applied to filter 22a/light amount applied to transparent plate 22d) when the incident position of light on the four-division filter 22 is shifted in the direction of the transparent plate 22d or in the opposite direction (direction of the filter 22a) as shown in (a) of FIG. 8. In addition, dT/dλ represents the inclination in the transmittance characteristic of the filter, T represents the transmittance, and SN represents the SN ratio of the received signal at the light receiving element 23d that receives the light transmitted through the transparent plate 22d.

Figure 8:
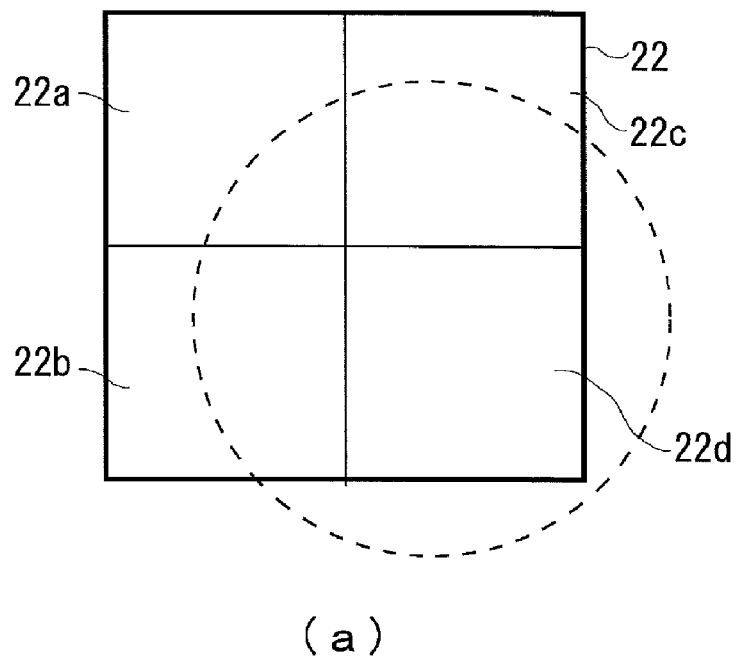
FIG. 8 shows a mode of incidence of light on a filter plate and a relationship between the transmittance and wavelength detection precision when light enters the filter plate non-uniformly according to Example 4 of the present invention.
Figure 8:
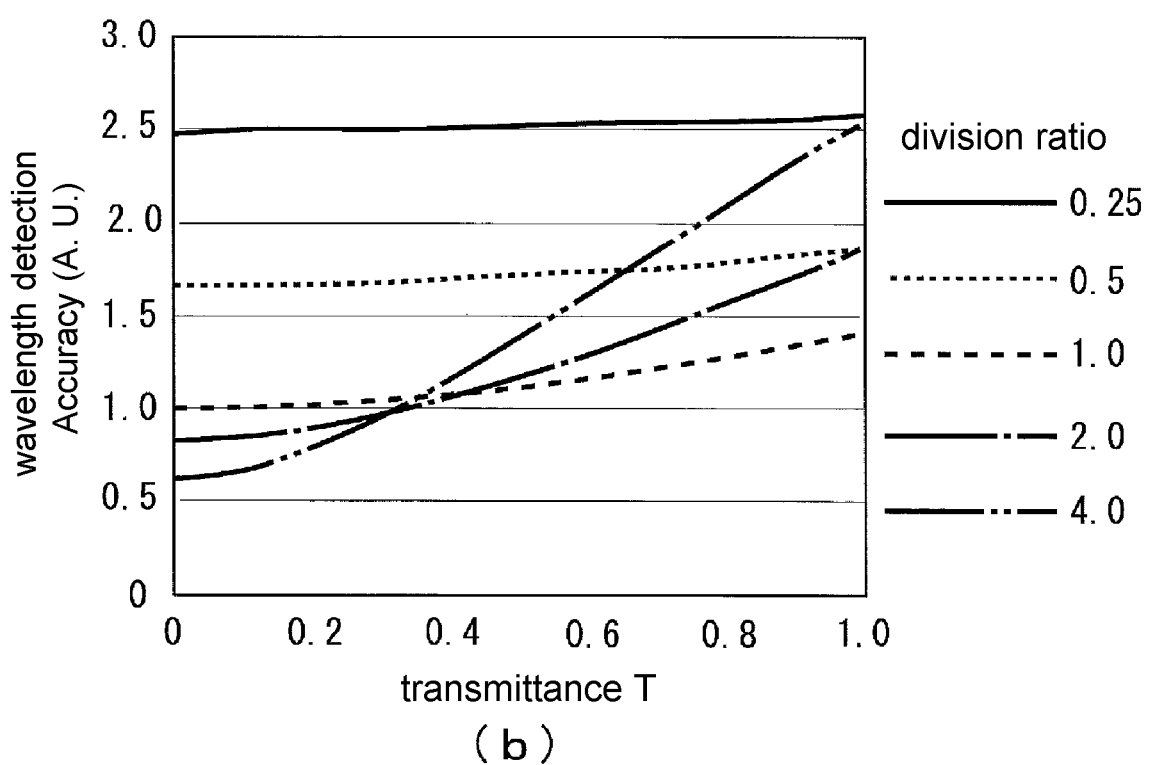
Figure 9:
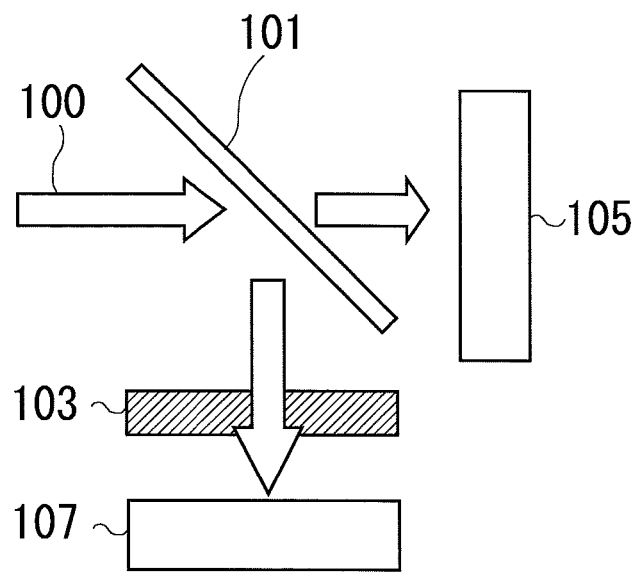
FIG. 9 explains a conventional basic principle of an optical wavelength monitor device using an optical filter.
Figure 9:
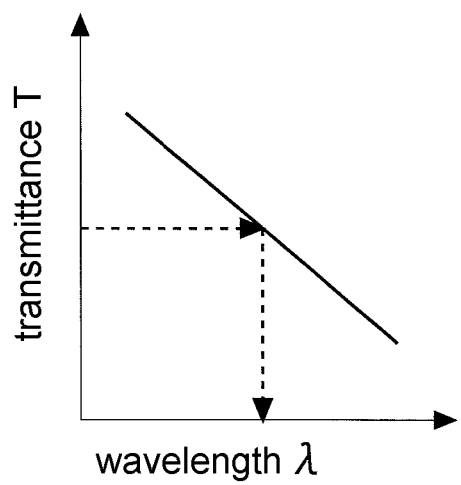

In this way, the wavelength precision is affected by the light amount division ratio $\alpha$. (b) of FIG. 8 is a diagram showing the relationship between the transmittance and the wavelength detection precision with the light amount division ratio $\alpha$ as a parameter. In (b) of FIG. 8, the horizontal axis represents the transmittance T and the vertical axis represents the wavelength detection precision $\sigma_\lambda$, and the wavelength detection precision $\sigma_\lambda$ is a numerical value that is higher in precision as the numerical value decreases. As shown in (b) of FIG. 8, compared with the case where the light amount division ratio $\alpha$ is 1, that is, the light enters the filter 22a and the transparent plate 22d evenly, when $\alpha$ is increased, it is possible to improve the wavelength detection precision in the region where the transmittance is low. Further, by reducing $\alpha$, it is possible to reduce the change in wavelength detection precision caused by the transmittance. Thus, by intentionally irradiating the four filters 22a to 22d including the transparent plate with light unevenly, it is possible to appropriately control the wavelength detection precision.

In addition, in the above examples, examples have been described in which the physical quantity related to the transmittance is the transmittance and the light that has passed through the filters 12a, 12b, 22a to 22d is received by the light receiving elements. However, in the above examples, the light that has been reflected in the filters 12a, 12b, 22a to 22d may be received by the light receiving elements, and the physical quantity related to the transmittance may be detected from the intensity of the reflected light. In this case, the physical quantity related to the transmittance may be reflectance, or the transmittance may be obtained by subtracting the reflectance from 1 or the like.

In addition, in order to make it possible to compare constitutional requirements of the present invention with constitutions of the examples, the constitutional requirements of the present invention are described with reference to symbols in the drawings.

<Invention 1>

A wavelength detection device (10), including:

a plurality of optical filters (12a, 12b);

a splitting unit (11) which splits light and allows the split lights to pass through the plurality of optical filters (12a, 12b);

a plurality of light receiving elements (13a, 13b) which detect the intensities of the lights which have passed through each of the plurality of optical filters (12a, 12b) or are reflected by each of the plurality of optical filters (12a, 12b); and a calculation portion which derives a physical quantity related to the transmittances of the plurality of optical filters (12a, 12b) from the outputs of the plurality of light receiving elements (13a, 13b), and derives the wavelengths of the lights which have passed through the plurality of optical filters (12a, 12b) on the basis of the transmittance characteristic which is a relationship between the physical quantity related to the transmittance and the wavelength of the light for the plurality of optical filters (12a, 12b);

wherein the transmittance characteristic of each of the plurality of optical filters (12a, 12b) has an inclination portion in different wavelength ranges of the wavelength range to be measured.

<Invention 2>

The wavelength detection device according to Invention 1, wherein the physical quantity related to the transmittance is transmittance, and wherein in the transmittance characteristic for each of the plurality of optical filters (12a, 12b), the transmittance of each of the optical filters (12a, 12b) changes between approximately 0 and approximately 1 in the inclination portion.

<Invention 3>

The wavelength detection device according to Invention 1 or 2, wherein the physical quantity related to the transmittance is transmittance, and wherein the absolute value of at least one inclination of the inclination portion is 0.0033 (1/nm) or more.

<Invention 4>

The wavelength detection device according to any one of Inventions 1 to 3, wherein the inclination portion in the transmittance characteristic of each of the plurality of optical filters (12a, 12b) is arranged so as to cover the wavelength range to be measured without any gap.

<Invention 5>

The wavelength detection device according to any one of Inventions 1 to 4, wherein among the transmittance characteristics of each of the plurality of optical filters (12a, 12b), two or more of the transmittance characteristics consist of curves that periodically change in the wavelength range to be measured and the curves related to each of the transmittance characteristics have different phases.

<Invention 6>

The wavelength detection device according to Invention 5, wherein the transmittance characteristics of each of the plurality of optical filters (12a, 12b) further include a transmittance characteristic consisting of a straight line or a curve that monotonically increases or monotonically decreases in the wavelength range to be measured.

<Invention 7>

The wavelength detection device according to any one of Inventions 1 to 6, wherein the plurality of optical filters are configured by dividing one filter plate (22) into a plurality of regions (22a to 22d) having different transmittance characteristics, and at least one of the plurality of regions (22a to 22d) having different transmittance characteristics is formed of a transparent plate (22d).

<Invention 8>

The wavelength detection device according to Invention 7, wherein the plurality of light receiving elements (23a to 23d) are arranged on the same substrate (23) so as to be able to respectively receive the light transmitted through the plurality of regions.

<Invention 9>

The wavelength detection device according to Invention 7 or 8, wherein the intensity of the light entering the plurality of optical filters (22*a* to 22*c*) and the transparent plate (22*d*) is non-uniform.

<Invention 10>

A confocal measurement device (50), including:

a light source (71) that emits light of a plurality of wavelengths;

a chromatic aberration imparting unit (62) for generating chromatic aberration in the light emitted from the light source (71) along an optical axis direction;

an objective lens (64) for condensing the light having chromatic aberration generated by the chromatic aberration imparting unit (62) on an measurement object;

a pinhole (63) that allows the light focused on the measurement object in the light condensed by the objective lens (64) to pass through; and the wavelength detection device (10) according to any one of Inventions 1 to 9;

wherein the confocal measurement device (50) measures a displacement of the measurement object from the wavelength of the light that has passed through the pinhole (63).

What is claimed is:

1. A wavelength detection device, comprising:
   a plurality of optical filters with different transmittance characteristics and allowing different wavelength ranges of light to pass through, respectively;
   a splitting unit which splits light and allows the split lights to pass through the plurality of optical filters;
   a plurality of light receiving elements which detect the intensities of the lights which have passed through each of the plurality of optical filters or are reflected by each of the plurality of optical filters; and
   a calculation portion which derives a physical quantity related to the transmittances of the plurality of optical filters from the outputs of the plurality of light receiving elements, and derives the wavelengths of the lights which have passed through the plurality of optical filters on the basis of the transmittance characteristic which is a relationship between the physical quantity related to the transmittance and the wavelength of the light for the plurality of optical filters;
   wherein the transmittance characteristic of each of the plurality of optical filters has an inclination portion in different wavelength ranges of the wavelength range to be measured, and the inclination portions in the transmittance characteristics of the plurality of the optical filters as a whole are arranged so as to cover different wavelength ranges in the wavelength range to be measured without any gap.

2. The wavelength detection device according to claim 1, wherein the physical quantity related to the transmittance is transmittance, and
   wherein in the transmittance characteristic for each of the plurality of optical filters, the transmittance of each of the optical filters changes between approximately 0 and approximately 1 in the inclination portion.

3. The wavelength detection device according to claim 1, wherein the physical quantity related to the transmittance is transmittance, and
   wherein the absolute value of at least one inclination of the inclination portion is 0.0033 (1/nm) or more.

4. The wavelength detection device according to claim 1, wherein the plurality of optical filters are configured by dividing one filter plate into a plurality of regions having different transmittance characteristics, and at least one of the plurality of regions having different transmittance characteristics is formed of a transparent plate.

5. The wavelength detection device according to claim 4, wherein the plurality of light receiving elements are arranged on the same substrate so as to be to respectively receive the light transmitted through the plurality of regions.

6. The wavelength detection device according to claim 4, wherein the intensity of the light entering the plurality of optical filters and the transparent plate is non-uniform.

7. A confocal measurement device, comprising:
   a light source that emits light of a plurality of wavelengths;
   a chromatic aberration imparting unit for generating chromatic aberration in the light emitted from the light source along an optical axis direction;
   an objective lens for condensing the light having chromatic aberration generated by the chromatic aberration imparting unit on a measurement object;
   a pinhole that allows the light focused on the measurement object in the light condensed by the objective lens to pass through; and
   the wavelength detection device according to claim 1;
   wherein the confocal measurement device measures a displacement of the measurement object from the wavelength of the light that has passed though the pinhole.

8. A wavelength detection device, comprising:
   a plurality of optical filters;
   a splitting unit which splits light and allows the split lights to pass through the plurality of optical filters;
   a plurality of light receiving elements which detect the intensities of the lights which have passed through each of the plurality of optical filters or are reflected by each of the plurality of optical filters; and
   a calculation portion which derives a physical quantity related to the transmittances of the plurality of optical filters from the outputs of the plurality of light receiving elements, and derives the wavelengths of the lights which have passed through the plurality of optical filters on the basis of the transmittance characteristic which is a relationship between the physical quantity related to the transmittance and the wavelength of the light for the plurality of optical filters;
   wherein the transmittance characteristic of each of the plurality of optical filters has an inclination portion in different wavelength ranges of the wavelength range to be measured,
   wherein among the transmittance characteristics of each of the plurality of optical filters, two or more of the transmittance characteristics consist of curves that periodically change in the wavelength range to be measured and the curves related to each of the transmittance characteristics have different phases.

9. The wavelength detection device according to claim 8, wherein the transmittance characteristics of each of the plurality of optical filters further include a transmittance characteristic consisting of a straight line or a curve that monotonically increases or monotonically decreases in the wavelength range to be measured.

* * * * *